(12) United States Patent
Bean et al.

(10) Patent No.: US 12,330,070 B2
(45) Date of Patent: Jun. 17, 2025

(54) SPECTATOR PARTICIPATION IN ESPORTS EVENTS

(71) Applicants: SONY INTERACTIVE ENTERTAINMENT LLC, San Mateo, CA (US); SONY INTERACTIVE ENTERTAINMENT INC., Tokyo (JP)

(72) Inventors: Celeste Bean, San Mateo, CA (US); Alessandra Luizello, San Mateo, CA (US); Genie-Rose Luluquisin, San Mateo, CA (US); Benaisha Patel, San Mateo, CA (US); Olga Rudi, San Mateo, CA (US)

(73) Assignees: SONY INTERACTIVE ENTERTAINMENT LLC, San Mateo, CA (US); SONY INTERACTIVE ENTERTAINMENT INC., Tokyo (JP)

( * ) Notice: Subject to any disclaimer, the term of this patent is extended or adjusted under 35 U.S.C. 154(b) by 133 days.

(21) Appl. No.: 17/870,021

(22) Filed: Jul. 21, 2022

(65) Prior Publication Data

US 2024/0024787 A1 Jan. 25, 2024

(51) Int. Cl.
*A63F 13/86* (2014.01)
*A63F 13/355* (2014.01)
(Continued)

(52) U.S. Cl.
CPC ............ *A63F 13/86* (2014.09); *A63F 13/358* (2014.09); *A63F 13/48* (2014.09); *A63F 13/355* (2014.09);
(Continued)

(58) Field of Classification Search
CPC ........ A63F 13/86; A63F 13/358; A63F 13/48; A63F 13/355; A63F 13/847; A63F 2300/535; A63F 2300/577
See application file for complete search history.

(56) References Cited

U.S. PATENT DOCUMENTS 7,446,772 B2 * 11/2008 Wong ...................... A63F 13/86
463/31
9,782,678 B2 10/2017 Long et al.
(Continued)

FOREIGN PATENT DOCUMENTS

CN 117138356 12/2023
WO WO 2023/235102 12/2023
(Continued)

OTHER PUBLICATIONS

PCT/US23/20990, International Search Report mailed Jul. 27, 2023 (9 pages).
(Continued)

*Primary Examiner* — Illiam H McCulloch, Jr.
*Assistant Examiner* — Ankit B Doshi
(74) *Attorney, Agent, or Firm* — Kilpatrick Townsend & Stockton LLP

(57) ABSTRACT

The present technology provides solutions for spectator-based interactions in a virtual esports environment. A method can include establishing an interactive session associated with the virtual esports environment, the interactive session including a plurality of user devices, wherein a subset of the user devices is associated with designated players, and another subset of the user devices is associated with designated spectators; receiving data from one of the user devices over a communication network, the data indicating a spectator action performed by a spectator associated with the user device; identifying that the spectator action is associated with one of the players in the virtual esports environment; and modifying the virtual esports environment based on the spectator action and the association with the identified player.

23 Claims, 5 Drawing Sheets

(51) Int. Cl.
*A63F 13/358* (2014.01)
*A63F 13/48* (2014.01)
*A63F 13/847* (2014.01)

(52) U.S. Cl.
CPC ....... *A63F 13/847* (2014.09); *A63F 2300/535* (2013.01); *A63F 2300/577* (2013.01)

(56) References Cited

U.S. PATENT DOCUMENTS

| | | | |
|---|---|---|---|
| 11,524,234 | B2 | 12/2022 | Salik |
| 12,064,690 | B2 | 8/2024 | Ikenaga et al. |
| 12,145,074 | B2 | 11/2024 | Singh et al. |
| 2006/0098013 | A1* | 5/2006 | Wong ................ A63F 13/5252 345/473 |
| 2009/0143141 | A1 | 6/2009 | Wells et al. |
| 2010/0041457 | A1 | 2/2010 | Cook et al. |
| 2011/0151974 | A1 | 6/2011 | Deaguero |
| 2013/0324247 | A1 | 12/2013 | Esaki et al. |
| 2014/0004951 | A1* | 1/2014 | Kern ....................... A63F 13/86 463/42 |
| 2015/0355826 | A1 | 12/2015 | Gibbons et al. |
| 2015/0360133 | A1 | 12/2015 | MacCallum et al. |
| 2016/0358082 | A1 | 12/2016 | Quintero |
| 2017/0001111 | A1* | 1/2017 | Willette .................. A63F 13/49 |
| 2018/0189077 | A1 | 7/2018 | Gupta et al. |
| 2019/0046886 | A1* | 2/2019 | George ................ A63F 13/211 |
| 2019/0262723 | A1* | 8/2019 | Trombetta .............. A63F 13/79 |
| 2020/0009458 | A1* | 1/2020 | Onda ...................... A63F 13/86 |
| 2020/0179809 | A1 | 6/2020 | Lin et al. |
| 2021/0038998 | A1 | 2/2021 | Tallarico et al. |
| 2021/0113926 | A1* | 4/2021 | Ziaja ...................... A63F 13/86 |
| 2021/0217245 | A1 | 7/2021 | Akman |
| 2021/0241507 | A1 | 8/2021 | Kazem et al. |
| 2021/0331072 | A1 | 10/2021 | Gibbon et al. |
| 2021/0346811 | A1 | 11/2021 | Khan et al. |
| 2022/0054945 | A1* | 2/2022 | Salik ...................... A63F 13/58 |
| 2022/0062778 | A1* | 3/2022 | Eatedali ................ A63F 13/792 |
| 2022/0168639 | A1 | 6/2022 | Nelson et al. |
| 2022/0203234 | A1* | 6/2022 | Olabode ................ A63F 13/795 |
| 2022/0219091 | A1* | 7/2022 | Kumah .................. A63F 13/86 |
| 2023/0381673 | A1 | 11/2023 | Azmandian et al. |
| 2023/0381674 | A1 | 11/2023 | Singh et al. |

FOREIGN PATENT DOCUMENTS

| | | |
|---|---|---|
| WO | WO 2023/235103 | 12/2023 |
| WO | WO 2024/019822 | 1/2024 |

OTHER PUBLICATIONS

PCT/US23/20991, International Search Report mailed Jul. 28, 2023 (14 pages).
PCT/US2023/024036, International Search Report mailed Aug. 25, 2023 (22 pages).
U.S. Appl. No. 17/828,974, Office Action mailed Jul. 20, 2023.
U.S. Appl. No. 17/828,974, Final Office Action mailed Feb. 29, 2024.
202310612571.X, Mahdi Azmandian, eSports Spectator Onboarding, May 29, 2023.
PCT/US2023/020990, Mahdi Azmandian, eSports Spectator Onboarding, May 31, 2022.
PCT/US2023/020991, Lachmin Singh, Triggering Virtual Help or Hindrance Based on Audience Participation Tiers.
PCT/US2023/024036, Celeste Bean, Spectator Participation in Esports Events.
U.S. Appl. No. 17/828,971, Office Action dated Sep. 13, 2024.
U.S. Appl. No. 18/917,167, US, Lachmin Singh, Triggering Virtual Help or Hindrance Based on Audience Participation Tiers, filed Oct. 16, 2024.
23816538.5, EP, Lachmin Singh, Triggering Virtual Help or Hindrance Based on Audience Participation Tiers, Oct. 18, 2024.

\* cited by examiner

SPECTATOR PARTICIPATION IN ESPORTS EVENTS

BACKGROUND OF THE INVENTION

1. Field of the Invention

Aspects of the subject technology relate to spectator participation in esports events, and in particular, to modifying a virtual environment of the esports event based on spectator actions.

2. Description of the Related Art

Interactive content—such as a video game—may be an electronic file executable to generate a virtual environment in which a player may interact with virtual characters and/or objects. The player may initiate and control such interaction using a user interface coupled to a computing device, which may respond to such interaction by generating audiovisual, haptic, and other feedback via an entertainment system, which may include a gaming console, a television screen, computer monitor, and sound system or audio system. The user interface may include, for example, an arcade joystick, a video game console controller, a computer keyboard, a computer mouse, a touchscreen display, cameras, sensors, etc.

Some video games may feature competitive or cooperative multi-player gameplay, thereby allowing multiple players—who may include both local and remote players—to play the same game simultaneously (e.g., during the same interactive session) in the same virtual environment. Certain competitions may be played tournament-style, in which a series of "esports" competitions are held among individual players or team of players.

In the same way that many sports fans enjoy watching sports games involving professional or amateur sports players both to learn sports techniques and to share a sense of community, many video game fans enjoy watching professional or amateur video game players both to learn video game techniques and to share a similar sense of community. Before the Internet, video game fans could watch a video game player play by being in the physical vicinity of the video game player and physically watching the video game player and the screen, such as at a friend's house, at an arcade, or at a video game competition. More recently, some video games with network connectivity have been developed with an integrated "spectator" functionality in the game's code or at the platform level, allowing users to watch an online stream of live gameplay without actually playing or influencing the outcome of the game. For example, video streaming services such as Twitch® allow a video game player to broadcast a video content stream of their live gameplay to subscribing spectators (via their respective spectator devices) over the Internet.

However, while a video game player at a traditional arcade might be able to physically step away from an arcade machine at which he/she is playing and interact in-person with a spectator, such in-person interactions cannot occur between esports player and their spectators, who may be located at remote locations. Additionally, while sports players playing a game in a sports stadium might be encouraged or discouraged by cheers, chants, boos, or jeers of sports spectators sitting in the stadium in earshot of the players, network-based video game spectators are typically silent and invisible, both to each other and to video game players. Thus, neither players nor spectators of network-based video games feel the same kind of sense of immediacy, community, common goal, or scale of fanbase that traditional sports players and sports spectators in a crowded sports arena (or other in-person settings) do.

There is, therefore, a need in the art for improved systems and methods of providing for spectator participation in esports events.

DETAILED DESCRIPTION

In the same way that many sports fans enjoy watching sports games involving professional or amateur sports players both to learn sports techniques and to share a sense of community, many video game fans enjoy watching professional or amateur video game players both to learn video game techniques and to share a similar sense of community. Competitive gaming, sometimes referred to as electronic sports or "esports," involves the play of video games in a competitive environment comparable to traditional sports.

During competitive gaming involving single-player games, players sometimes compete to achieve a high score, or to achieve a particular goal within the video game in a record time, sometimes referred to as a "speed run." During competitive gaming involving multi-player games, players sometimes likewise compete for best scores or times, but are also sometimes ranked against each other based on numbers of wins and/or losses against one another, or other statistics, often based on multiple game "matches" spread out over time, sometimes in a tournament style.

Competitive gaming includes localized video game competitions that take place in a particular physical location, in which case spectators may be in the physical vicinity of the players. Competitive gaming also includes virtual video game competitions with a more virtual organization structure conducted online, where gameplay footage may be distributed to spectators via a network connection via video stream. Due to increasing popularity of the competitive gaming community, competition providers such as Major League Gaming (MLG) have more recently endeavored to provide an increased level of organization and structure to video game competitions for a number of video games, especially at the professional level.

The subject technology described herein enhances and expands the functionality of server(s) that provide gameplay information to video game spectators and of user devices corresponding to spectators. The servers may be associated with a video game, a video game platform/console, a video game league, or a combination thereof. The server(s) monitor timers, spectator actions, and/or in-game events to identify that a trigger event has occurred, and in response, the server(s) can modify the virtual environment of the video game based on the trigger event. For example, the server can monitor spectator actions (e.g., spectator cheering via a microphone), identify that the actions are associated with a player (e.g., spectator is cheering for a specific player) and modify stats of the player in the virtual environment.

Figure 1:
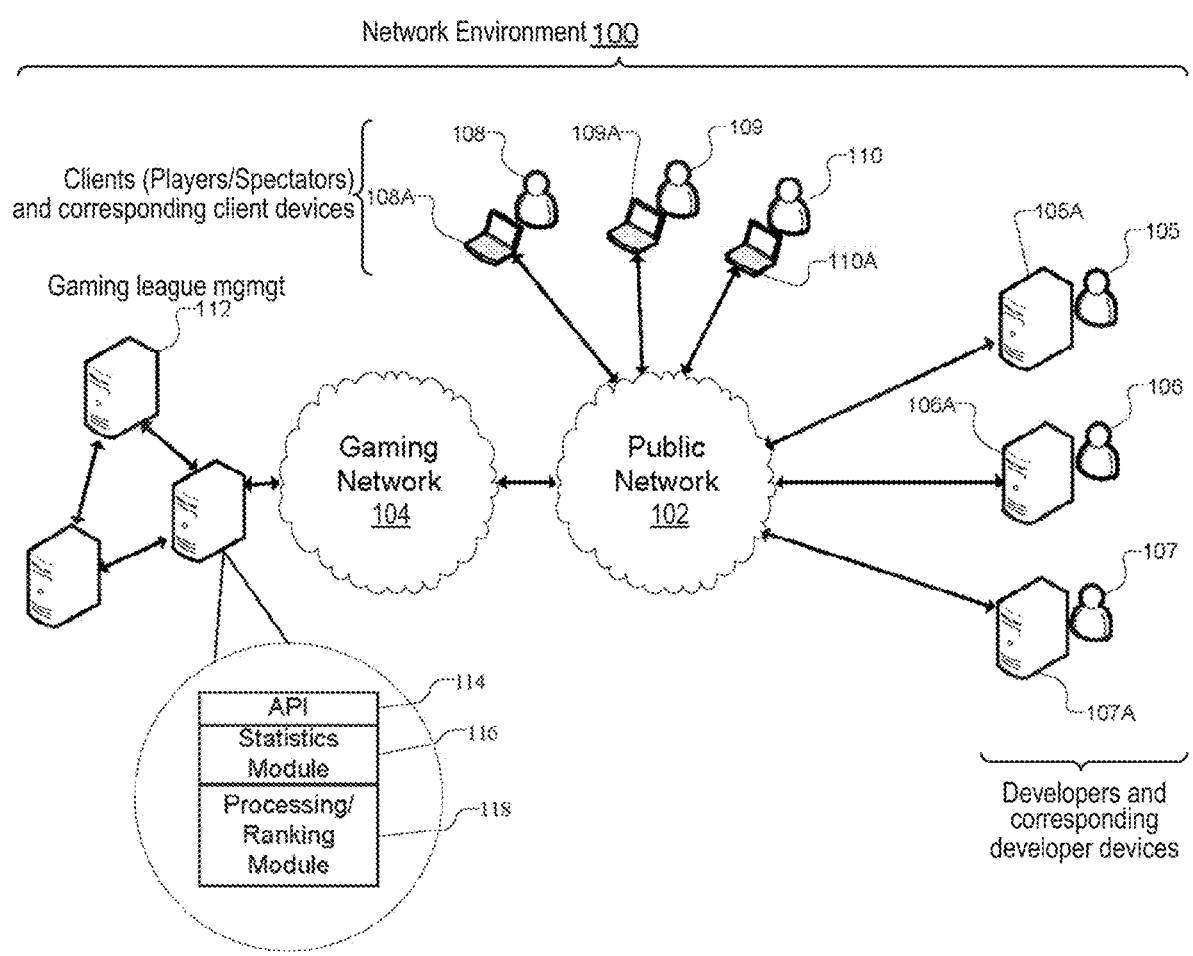
FIG. 1 illustrates an example of a network environment in which some aspects of the technology can be implemented.

FIG. 1 illustrates an example of network environment in which some aspects of the technology can be implemented. Network environment 100 includes public network 102, which can include one or more private networks, such as a local area network (LAN), a wireless local area network (WLAN), a wide area network (WAN), or a network of public/private networks, such as the Internet. Public network 102 is communicatively coupled to gaming network server 104, which may for example represent multiple servers, associated routers, and other network hardware 220 supporting online gameplay for a particular type of client computing device, such as a particular brand of video game console. The gaming network server 104 may be inclusive of a variety of servers and other network hardware/resources configured for implementing an esports management system 112. The esports management system 112 may also optionally operate on other gaming network servers 104 for interoperability of gaming leagues between different gaming network servers 104 and therefore different types of client computing devices 210. The esports management system 112 may include a number of servers and/or routers associated with operation and maintenance of network-based gameplay for particular video games, a particular video game platform/console, a video game league, or a combination thereof. For example, the esports management system 112 can generate a virtual esports environment for a particular video game, a particular video game platform/console, a video game league, or a combination thereof. The servers, routers, and other hardware used in esports management system 112, gaming network server 104, and public network 102 may be computer systems 500 as illustrated in and discussed with respect to FIG. 5, or may include components of the computer systems 500.

Public network 102, and gaming network server 104 provide client and developer access to esports management system 112. As illustrated, clients 108, 109, and 110 are permitted access to esports management system 112 using respective client devices (e.g., 108A, 109A, and 110A). Clients, and their respective devices, may take on a player role or a spectator role at any given time in a given video game match. Although client devices 108A, 109A, and 110A, are depicted as personal computing devices, it is understood that the client devices can include various types of processor-based systems, including but not limited to: game consoles, smart phones, tablet computer systems, and the like. Example of hardware systems that can be used to implement the client device are illustrated in and discussed in further detail below with respect to FIGS. 2 and 5. Similarly, developers (e.g., 105, 106 and 107), are permitted access to league management system via respective their computing systems (e.g., 105A, 106A, and 107A). Developer computing systems may likewise be computer systems 500 as illustrated in and discussed with respect to FIG. 5, or may include components of the computer systems 500.

In some embodiments, client devices 108A, 109A, and 110A can include various sensors that can observe spectator actions. For example, client devices 108A, 109A, and 110A can include one or more microphones to record 3D audio feedback, which can be used to determine when a spectator is cheering or jeering. As another example, client devices 108A, 109A, and 110A can include motion sensors, cameras, and/or haptics to determine when a user performs an action for cheering or jeering (e.g., jumping up and down, clapping hands, etc.). As yet another example, client devices 108A, 109A, and 110A can utilize a controller or other input device to receive inputs to facilitate spectator participation (e.g., virtual clapping, cheers, throw virtual glitter/confetti, trigger virtual fireworks, related audiovisual effects, etc.). Additionally, the input device can also be used to provide feedback to the user. For example, the input device can shake in response to in-game thunder noises. In some embodiments, the data can include complexity, volume, and other characteristics of the spectator actions. For example, the data can include an intensity of how loud a cheer is, an intensity of how animated a dance is, etc.

It is understood that a greater or smaller number of clients and/or developers can be engaged with environment 100 than are illustrated in FIG. 1 and described herein, without departing from the scope of the technology.

Some video games, especially those with online multiplayer capabilities, allow spectators to watch gameplay without actually playing or influencing the outcome of the game in any way. The spectator functionality is typically developed by developers (e.g., 105, 106 and 107) with an integrated "spectator" functionality. The integrated "spectator" functionality may be integrated into code of the particular video game that runs during gameplay and/or into online servers that help operate the particular video game's online multiplayer functionality. A spectator client using such an integrated spectator function generally has a copy of the video game whose gameplay he/she is spectating on his/her corresponding client device, allowing the spectator client device to render the gameplay in the same way or in a similar way that client computing devices of player clients render the gameplay, only without giving the spectator client any opportunity to control the gameplay via the spectator's client computing device.

This type of game-integrated spectating technology has the benefit of being more efficient in terms of network bandwidth usage than spectating via streaming of video content, as online games are typically optimized to use as little bandwidth as possible to maintain an acceptable gameplay speed for all players and spectators. The online games accomplish this by transmitting instructions as to how to render a shared virtual space, and then how to render modifications/updates to that shared virtual space over the course of gameplay over a time period between a beginning and an end of a game match. While the initial rendering of the shared virtual space may be complex—for instance, the game and/or game's servers may instruct player and spectator client devices to render numerous character avatars, pieces of scenery, landscapes, buildings, and so forth—later updates/modifications to the shared virtual space are generally less complex. For instance, for an update/modification during gameplay in the example of the preceding sentence, the game and/or game's servers may instruct player and spectator client devices to render that one of the character avatars has moved forward slightly while everything else previously rendered has remained static.

Spectating can occur via online video streaming, which allows spectators (via their spectator devices) to stream video content of recorded or live gameplay, either in real-time or with a slight delay. In reference to FIG. 1, the gameplay video may be captured or recorded at player client devices (108A/109A/110A) and sent to spectator client devices (108A/109A/110A), optionally via networks 102/104/112 or similar video-streaming-focused networks not illustrated in FIG. 1. Video streaming allows, for example, video games that do not have integrated spectator functionality to be spectated, for instance allowing spectators to watch a player play an older or legacy game title, an emulated game, or a game that otherwise has no online connectivity, as well as allowing a wide variety of computing devices to be used to spectate, regardless of processing capability or compatibility with the game title. That is, a spectator can spectate a player playing a graphically intensive game from their phone or another device that would not otherwise have the processing capabilities to render the gameplay of the graphically intensive game, and/or that is running an operating system that is not compatible with the graphically intensive game.

Integrated spectating technology may be provided by the game title itself, as well as associated platforms, service providers, and/or devices, including client device (such as a particular brand of video game console/platform), the gaming network server 104, and/or an esports management system 112. That is, client computing devices 108A/109A/110A of a particular type—such as video game consoles of a particular brand—may include this integrated spectating technology, as well as the gaming network server 104 associated with client computing devices 210 of that particular type. Alternately or additionally, client computing devices 210 that are optionally of different types may all be compatible with an esports management system 112 that includes servers 112 and/or software running on the client computing devices 210.

The particular type of client device (such as a particular brand of video game console/platform), the gaming network server 104, and/or an esports management system 112 may include application programming interfaces (APIs) associated with spectating video games. In FIG. 1, for instance, the esports management system 112 is illustrated as having an API 114, though the APIs discussed herein may alternately or additionally be implemented in the gaming network server 104 and/or the client computing devices 210. An individual video game and/or servers associated with the individual video game can then call spectator functions coded into such an API during gameplay to invoke spectator functionality. The spectator function may be standardized across that type of client device 210, that gaming network server 104, and/or that esports management system 112. In this way, a spectator client device having access to the gaming network server 104 may further access the esports management system 112, or a combination thereof, to access esports-related streams and related content and services.

Because the video game data may be in a standardized format using the API 114 or a gaming network server 104 API (or other type of data file), as long as the spectator client device can operate with the esports management system 112 or gaming network server 104, spectator client device can spectate the game. For example, a client computing device running an operating system that is incompatible with a particular video game but that is compatible with the esports management system 112 or gaming network server 104 may still be able to spectate a game match of that otherwise incompatible video game. Game-integrated, console/platform-integrated, network-integrated, and/or league-integrated spectating technologies may provide extended levels of control for spectators because information about the entire shared virtual space is sent to the spectator, not just what a particular player sees, before the game content is rendered at the spectator's computing device. The spectator can be given an increased control over their view of the gameplay, allowing the spectator to pan, zoom, or rotate their perspective. A spectator may also emulate different viewing perspectives of different players currently playing the game, in series or in parallel. In this way, in a game with multiple players in the same shared virtual environment, a spectator may be able to view more than any individual player can, for example by repeatedly changing their view of the shared virtual space.

Game-integrated, console/platform-integrated, network-integrate, and/or league-integrated spectating technologies also allow additional ways for players and spectators to interact with the shared virtual environment and with each other. For example, integrated spectating technologies allow two client devices to interact as illustrated in and discussed with respect to FIG. 3. In some games, spectators may form a virtual audience that may be visible and/or audible within the game by players and/or by other spectators, for example causing the game to generate different levels of cheering, chanting, booing, or jeering based on positive or negative inputs from spectators, the positive or negative inputs optionally concerning a particular human player, a particular computer-controlled simulated player, or a particular team of players, as illustrated in and discussed with respect to FIG. 3.

Some games may generate a spectator-controllable avatar that a spectator that can move throughout the shared virtual environment of the game during gameplay responsive to inputs to the gaming network server 104 and/or esports management system 112 from spectator client devices 210, where the spectator-controllable avatar has limited or no ability to interact with players in a manner that impacts the outcome of the game. Such a spectator avatar might be visible to players or might only be visible to other spectators. In some games, spectators might be able to alter the shared game environment in ways that affect gameplay for players, for instance by changing colors of certain areas or by setting traps that can hinder players.

Furthermore, esports management system 112 can modify the shared virtual environment to identify or spotlight individual spectators (e.g., by providing identifying effects on an avatar associated with the spectator(s) in the virtual environment) that are being particularly loud, have the best cheer, commentary, dances, costumes, length of being a fan, etc. Additionally, various contests can be hosted by esports management system 112, which can then determine a winner (e.g., by user votes) and provide various prizes by modifying the virtual environment. For example, esports management system 112 can modify the virtual environment by generating a virtual asset (e.g., a unique virtual cosmetic item, a virtual special audiovisual effect, etc.) for the winning user and/or providing a virtual ability that is not typically available (e.g., flying) to the user. Additionally or alternatively, esports management system 112 can modify the virtual environment for groups of spectators associated with one or more players or teams. For example, fans of a specific player may be given special virtual abilities (e.g., flying) or assets (e.g., virtual t-shirts, penants, etc.) when the specific player breaks a record, hits a milestone, wins a battle, etc. Similarly, esports management system 112 can modify the virtual environment to penalize groups of spectators when the groups are not cheering enough. For example, the esports management system 112 can penalize spectators by removing their ability to fly.

Some games may also have periods of downtime. For example, some games may have a half-time break or times of lower action. To fill the downtime, esports management system 112 can receive third-party content (e.g., live content providers, streaming services, TikTok influencers, curated content, commentary, etc.) and integrate the third-party content into the virtual environment. It is also considered that the esports management system 112 can generate virtual sub-environments in the virtual environment, such that each virtual sub-environment can be directed to related games, contests, and/or entertainment.

Figure 2:
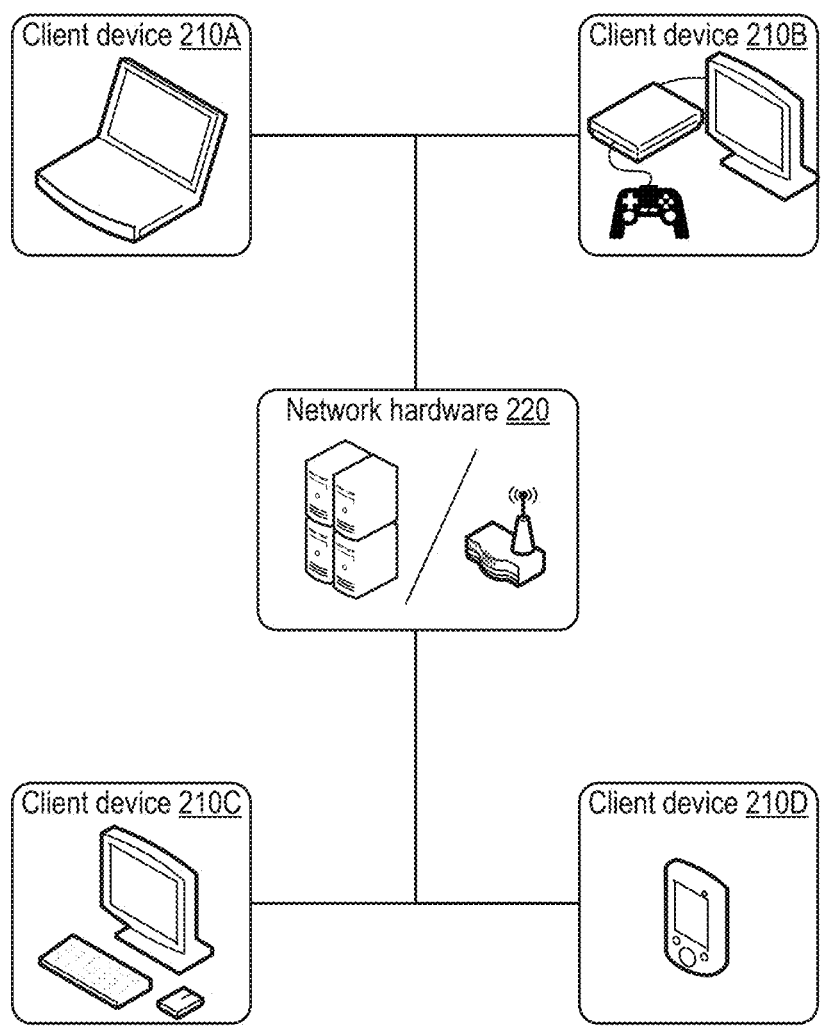
FIG. 2 illustrates a network-based video game environment involving different types of client computing devices.

FIG. 2 illustrates a network-based video game environment involving different types of client computing devices. The network environment 100 of FIG. 1 may be implemented using different types of client computing devices 210, each of which represent computer systems 500 or at least include components as being part of the computer system 500 of FIG. 5.

For instance, FIG. 2 illustrates a first client computing device 210A that is a laptop portable computer, a second client computing device 210B that is a home video game console connected to a television, a third client computing device 210C that is a desktop home computer, and a fourth client computing device 210D that is a smartphone/tablet portable computing device and/or a portable video game console. Any of the client computing devices 210 of FIG. 2 may be assigned player roles or spectator roles for a particular game. In the context of the environment 100 of FIG. 1, each of the client computing devices 108A, 109A, and 110A of FIG. 1 are client computing devices 210.

All four of the client computing devices 210 of FIG. 2 are communicatively coupled together via network hardware 220, which in the context of the environment 100 of FIG. 1, may include various servers, routers, and other network hardware within one or more esports management system(s) 112, one or more gaming network(s) 104, the public network 102, or a combination thereof.

Figure 3:
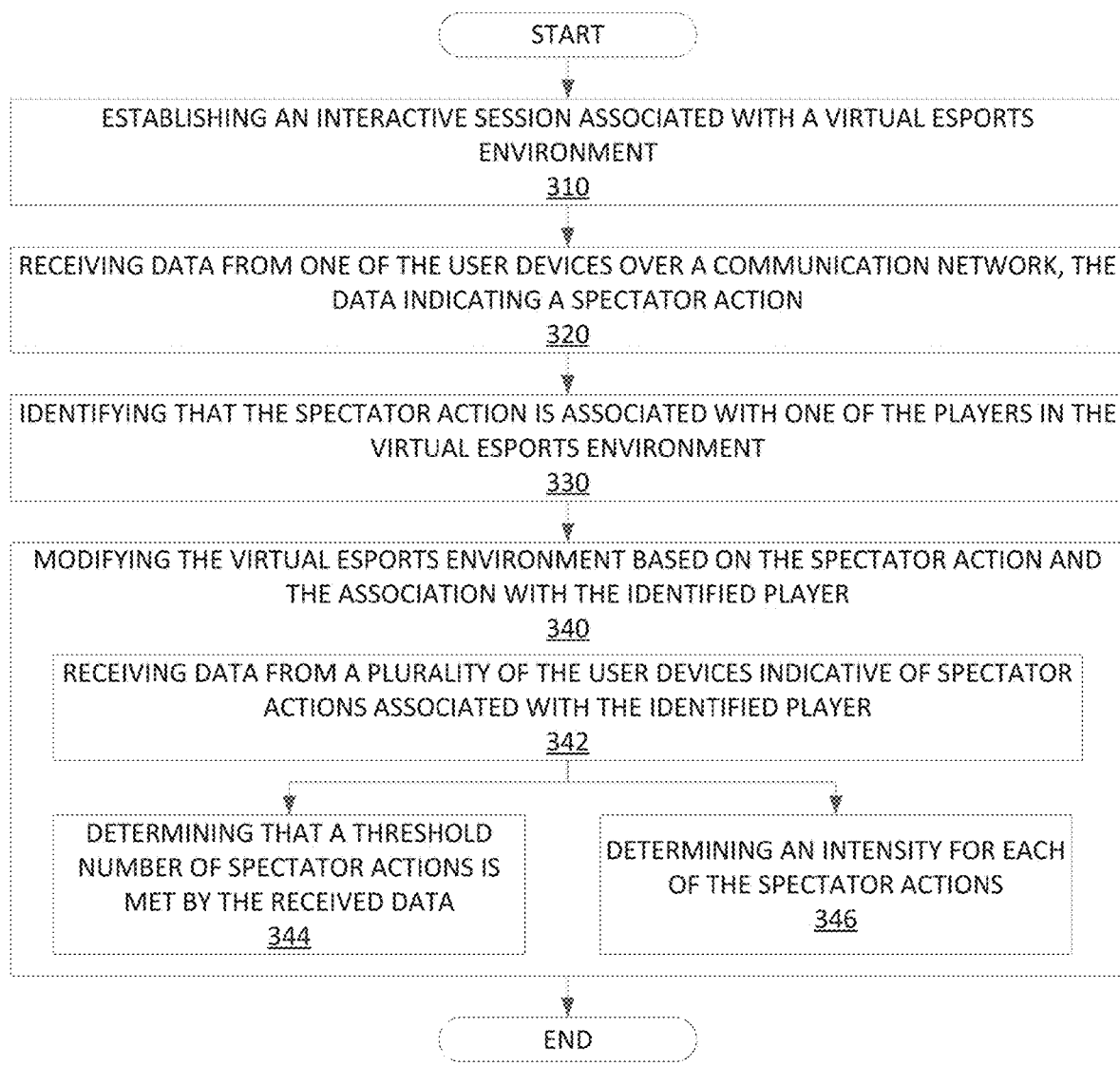
FIG. 3 illustrates a flow diagram illustrating server network operations for modifying virtual esports environments based on spectator actions.

FIG. 3 illustrates a flow diagram illustrating server network operations for modifying virtual esports environments based on spectator actions. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

At step 310, a game server (e.g., esports management system 112) establishes an interactive session associated with a virtual esports environment. The interaction session can include a plurality of user devices. A subset of the user devices can be associated with designated players, while another subset of the user devices can be associated with designated spectators.

At step 320, the game league management server or associated esports management system 112 receives data from one of the user devices over a communication network (e.g., public network 102 and/or gaming network server 104). The data can indicate a spectator action performed by a spectator associated with the user device.

At step 330, the game league management server or associated esports management system 112) identifies that the spectator action is associated with one of the players in the virtual esports environment. For example, the spectator may be a fan of a specific player and the spectator action may be the spectator cheering for the specific player.

At step 340, the game league management server or associated esports management system 112) modifies the virtual esports environment based on the spectator action and the association with the identified player. In some embodiments, modifying the virtual esports environment includes adjusting a parameter associated with the player within virtual esports environment of the interactive session. For example, when a spectator cheers for the player, esports management system 112 can adjust a speed parameter of the player, such that the player is faster for each spectator cheering. In some embodiments, modifying the virtual esports environment is further based on one of the players in the virtual esports environment meeting a conditional requirement. For example, esports management system 112 can perform modifications (e.g., audiovisual effects, virtual avatar capabilities, informative notifications, etc.) to the virtual environment when a player breaks a record, hits a milestone, wins a battle, performs a specific action (e.g., an advanced or difficult maneuver). It is further contemplated that modifying the virtual esports environment can include providing a virtual action that is otherwise unavailable to an avatar associated with the user device. For example, esports management system 112 can provide a spectator avatar the ability to fly. In some embodiments, modifying the virtual esports environment can include limiting a virtual action or ability of an avatar associated with the user device. For example, esports management system 112 can remove the ability to fly from a spectator avatar.

In some embodiments, step 340 can include steps 342, 344, and 346.

At step 342, the game server (e.g., esports management system 112) receives data from the plurality of the user devices indicative of spectator actions associated with the identified player.

At step 344, the game server (e.g., esports management system 112) determines that a threshold number of spectator actions is met by the received data. For example, esports management system 112 may determine that a threshold number of spectators have applauded, cheered, or otherwise celebrated a player action. Thus, esports management system 112 can modify the virtual environment upon determining that the threshold number of spectator actions is met by the received data.

At step 346, the game server (e.g., esports management system 112) determines an intensity for each of the spectator actions. For example, esports management system 112 may determine how loudly each spectator is cheering and/or how aggressively each spectator is clapping. Thus, esports management system 112 can modify the virtual environment based on at least one of the determined intensities of each of the spectator actions. For example, a spectator can be penalized when the spectator is not cheering for their team or player by losing the ability to perform actions (e.g. cheering, dancing, flying, etc.) in the virtual environment.

Figure 4:
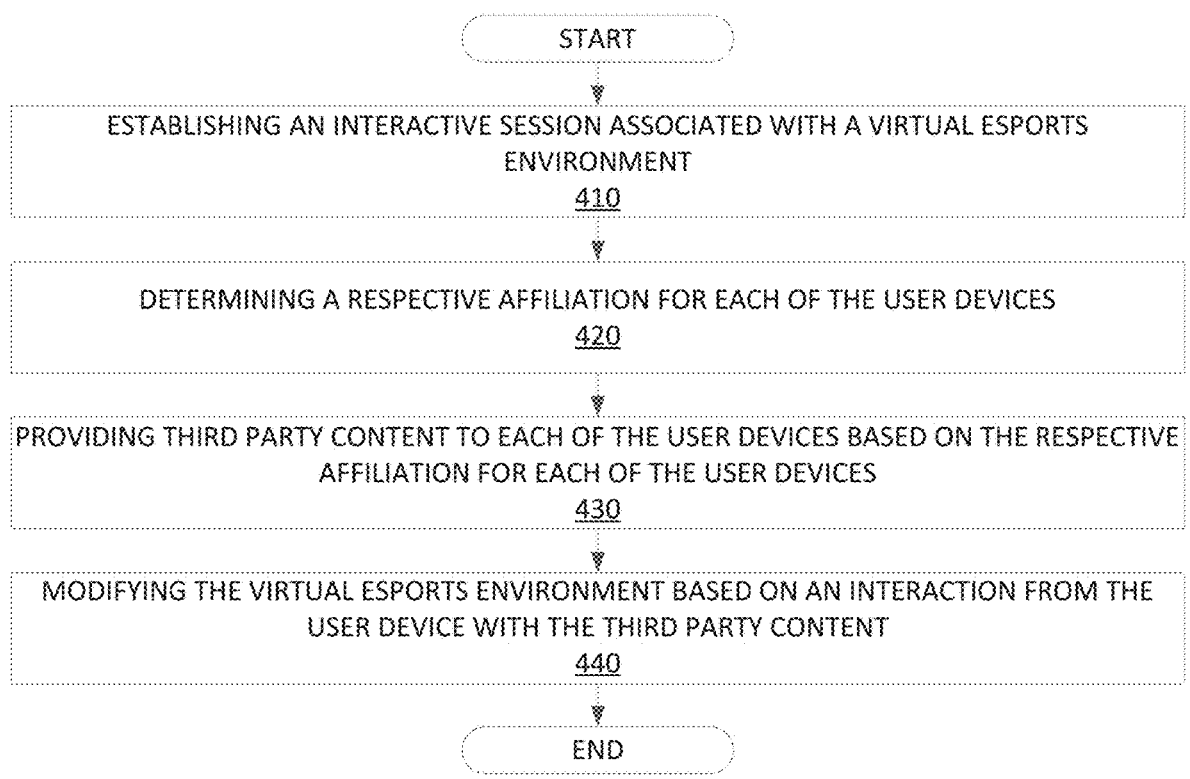
FIG. 4 illustrates a flow diagram illustrating server network operations for modifying virtual esports environments based on interactions with third party content.

FIG. 4 illustrates a flow diagram illustrating server network operations for modifying virtual esports environments based on interactions with third party content.

At step 410, the game server (e.g., esports management system 112) establishes an interactive session with a virtual esports environment. The interactive session can include a plurality of user devices, such that at least a subset of the user devices is associated with designated spectators.

At step 420, the game server (e.g., esports management system 112) determines a respective affiliation for each of the user devices. For example, a user may indicate that they are a fan of a team, such that esports management system 112 can determine an affiliation between the user device associated with the user and the team. As another example, the user may indicate that they are interested in a certain genre of games or entertainment, such that esports management system 112 can determine an affiliation between the user device with the genre of interest.

At step 430, the game server (e.g., esports management system 112) provides third party content to each of the user devices based on the respective affiliation for each of the user devices. For example, esports management system 112 can provide third-party content associated with a player or team of interest and/or games or media of interest.

At step 440, the game server (e.g., esports management system 112) modifies the virtual esports environment based on an interaction from the user device with the third-party content. In some embodiments, modifying the virtual esports environment includes providing the user device with a virtual asset. In some embodiments, the virtual asset can be a digital reward, badge, virtual t-shirt, etc. For example, the user associated with the user device may be chosen as a winner for a third-party contest, game, and/or mini-game and be awarded with a virtual trophy.

Figure 5:
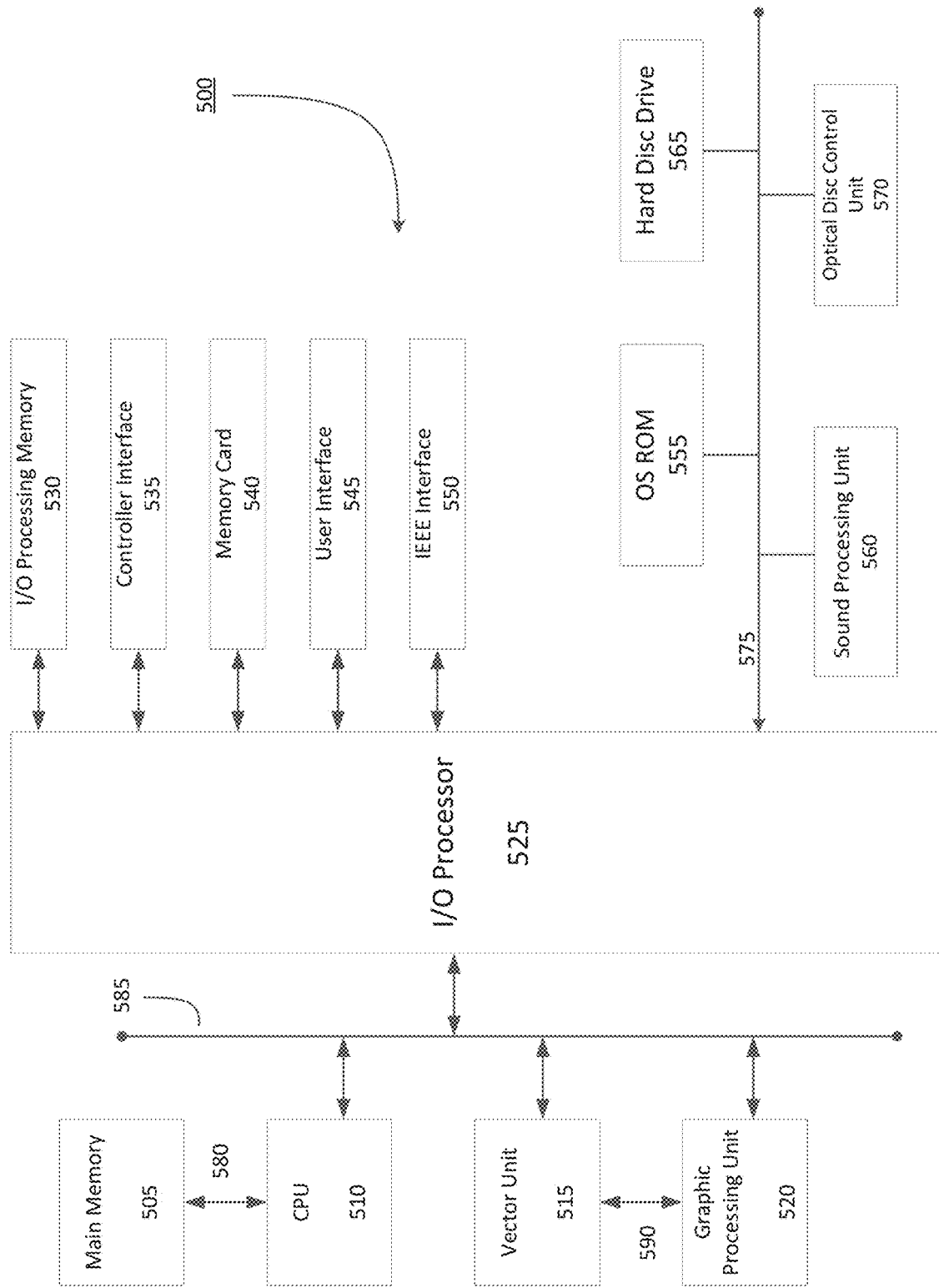
FIG. 5 is a block diagram of an exemplary computing device that may be used to implement some aspects of the subject technology.

FIG. 5 is a block diagram of an exemplary electronic entertainment system 500. The entertainment system 500 of FIG. 5 includes a main memory 505, a central processing unit (CPU) 510, vector unit 515, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4$, LTE, 3G, and so forth). The I/O processor 525 of FIG. 5 primarily controls data exchanges between the various devices of the entertainment system 500 including the CPU 510, the vector unit 515, the graphics processing unit 520, and the controller interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 1394 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method for spectator-based interactions in virtual esports environments, the method comprising:

establishing an interactive session at one or more gaming servers associated with rendering, on a display, a virtual esports environment for a plurality of user devices each connected to the one or more gaming servers via a communication network, wherein a first subset of the user devices is associated with one or more designated players, and a second subset of the user devices is associated with one or more designated spectators associated with respective spectator avatars within the virtual esports environment;

receiving data from one user device of the second subset of the user devices over the communication network, the data indicating input received by the one user device;

identifying a spectator action based at least in part on the data;

identifying the spectator action is associated with an avatar associated with one of the designated players determined to have met a condition in the same interactive session as a spectator avatar of the respective spectator avatars; and modifying the display of the virtual esports environment based on the spectator action, wherein modifying the display of the virtual esports environment includes providing a virtual action to the spectator avatar, wherein the virtual action is limited until the modification is made to the virtual esports environment.

2. The computer-implemented method of claim 1, wherein modifying the display of the virtual esports environment further comprises:

receiving second data from the plurality of the user devices indicative of a plurality of spectator actions associated with the avatar associated with the one of the designated players; and determining that a threshold number of spectator actions is met by the second data, wherein modifying the display of the virtual esports environment is further based on the determination that the threshold number is met.

3. The computer-implemented method of claim 1, wherein the data further includes an intensity parameter associated with the spectator action.

4. The computer-implemented method of claim 1, wherein the data is captured by one or more sensors of the one user device associated with the spectator avatar.

5. The computer-implemented method of claim 1, wherein modifying the display of the virtual esports environment is further based on an avatar of one of the players in the virtual esports environment meeting a conditional requirement.

6. The computer-implemented method of claim 1, wherein modifying the display of the virtual esports environment further comprises:

receiving data from a plurality of the user devices indicative of a plurality of spectator actions associated with the avatar associated with the one of the designated players; and determining an intensity for each of the spectator actions, wherein modifying the display of the virtual esports environment is based on at least one of the intensities of at least one of the spectator actions.

7. The computer-implemented method of claim 1, wherein modifying the display of the virtual esports environment further includes generating the virtual action by the one user device associated with the spectator avatar.

8. The computer-implemented method of claim 1, wherein modifying the display of the virtual esports environment further includes limiting a second virtual action of the spectator avatar.

9. The computer-implemented method of claim 1, wherein modifying the display of the virtual esports environment further includes generating a visual indicator of the spectator avatar.

10. A system for spectator-based interactions in virtual esports environments, the system comprising:

a communication interface that communicates over a communication network, wherein the communication interface:

establishes a connection to an interactive session at one or more gaming servers associated with rendering, on a display, a virtual esports environment for a plurality of user devices each connected to the one or more gaming servers via the communication network, wherein a first subset of the user devices is associated with one or more designated players, a second subset of the user devices is associated with one or more designated spectators associated with respective spectator avatars within the virtual esports environment; and receives data from one user device of the second subset of the user devices over the communication network, the data indicating input received by the one user device; and identifies a spectator action based at least in part on the data;

a processor that executes instructions stored in memory, wherein the processor executes the instructions to:

identify the spectator action is associated with an avatar associated with one of the designated players determined to have met a condition in the same interactive session as a spectator avatar of the respective spectator avatars; and modify the display of the virtual esports environment based on the spectator action, wherein modifying the display of the virtual esports environment includes providing a virtual action to the spectator avatar, wherein the virtual action is limited until the modification is made to the virtual esports environment.

11. The system of claim 10, wherein the processor modifies the virtual esports environment by:

receiving second data from the plurality of the user devices indicative of a plurality of spectator actions associated with the avatar associated with the one of the designated players; and determining that a threshold number of spectator actions is met by the second data, wherein modifying the display of the virtual esports environment is further based on the determination that the threshold number is met.

12. The system of claim 10, wherein the data further includes an intensity parameter associated with the spectator action.

13. The system of claim 10, wherein the data is captured by one or more sensors of the one user device associated with the spectator avatar.

14. The system of claim 10, wherein the processor modifies the virtual esports environment further based on an avatar of one of the players in the virtual esports environment meeting a conditional requirement.

15. The system of claim 10, wherein the processor further modifies the virtual esports environment by:

receiving data from a plurality of the user devices indicative of a plurality of spectator actions associated with the avatar associated with the one of the designated players; and determining an intensity for each of the spectator actions, wherein modifying the display of the virtual esports environment is based on at least one of the intensities of at least one of the spectator actions.

16. The system of claim 10, wherein the processor further modifies the display of the virtual esports environment by generating the virtual action by the avatar associated with the one user device associated with the spectator avatar.

17. The system of claim 10, wherein the processor further modifies the virtual esports environment by limiting a second virtual action of the spectator avatar.

18. A non-transitory computer-readable medium storing instructions thereon, wherein the instructions are effective to cause a processor to perform a method for spectator-based interactions in virtual esports environments, the method comprising:
- establishing an interactive session at one or more gaming servers associated with rendering, on a display, a virtual esports environment for a plurality of user devices each connected to the one or more gaming servers via a communication network, wherein a first subset of the user devices is associated with one or more designated players, and a second subset of the user devices is associated with one or more designated spectators associated with respective spectator avatars within the virtual esports environment;
- receiving data from one user device of the second subset of the user devices over the communication network, the data indicating input received by the one user device;
- identifying a spectator action based at least in part on the data;
- identifying the spectator action is associated with an avatar associated with one of the designated players determined to have met a condition in the same interactive session as a spectator avatar of the respective spectator avatars; and
- modifying the display of the virtual esports environment based on the spectator action, wherein modifying the display of the virtual esports environment includes providing a virtual action to the spectator avatar, wherein the virtual action is limited until the modification is made to the virtual esports environment.

19. The method of claim 1, wherein the virtual action includes a speed parameter associated with the avatar associated with the one of the designated players, and wherein the speed parameter is increased based on the spectator action.

20. The method of claim 1, wherein the spectator action includes setting a trap that hinders one or more of avatars associated with the players.

21. The method of claim 1, wherein the virtual action is associated with one or more stats associated with the avatar associated with the one of the designated players in the virtual esports environment.

22. The method of claim 1, wherein modifying the display of the virtual esports environment further includes generating a virtual asset for the avatar associated with the one of the designated players.

23. The method of claim 1, wherein modifying the display of the virtual esports environment further includes providing or removing a virtual ability associated with the spectator avatar or the avatar associated with the one of the designated players.

* * * * *